United States Patent [19]
Rice

[11] 3,755,834
[45] Sept. 4, 1973

[54] BOAT TRAILER
[76] Inventor: Henry T. M. Rice, 1213 Ramona St., San Gabriel, Calif. 91776
[22] Filed: Feb. 16, 1971
[21] Appl. No.: 115,294

[52] U.S. Cl. .................... 9/1 T, 214/84, 280/414 R
[51] Int. Cl. ........................ B63c 13/00, B60p 3/10
[58] Field of Search ................................ 9/1 R, 1 T; 114/0.5 R, 0.5 F, 43.5; 280/414 R; 214/505, 506, 500, 84

[56] References Cited
UNITED STATES PATENTS

| 3,608,754 | 9/1971 | Park | 9/1 T X |
|---|---|---|---|
| 2,361,951 | 11/1944 | Livermon | 9/1 T |
| 3,004,771 | 10/1961 | Moore | 9/1 T |
| 2,371,461 | 3/1945 | Newell | 9/1 T X |
| 3,119,127 | 1/1964 | Taggert | 9/1 T |
| 3,339,217 | 9/1967 | Gudmundson | 9/1 T |

Primary Examiner—Milton Buchler
Assistant Examiner—Barry L. Kelmachter
Attorney—Bernard Kriegel and Kendrick, Subkow & Kriegel

[57] ABSTRACT

A boat trailer including a trailer frame carrying a float member thereabove adapted to receive and support a boat, the float member being movable vertically relative to the frame. When the trailer is disposed in the water, its frame drops vertically relative to the float member to an extent limited by the float member, enabling the boat to back off from the float member and trailer under its own power, as well as to move forwardly into the float member and over the trailer to a position to be supported by the trailer when it is pulled fully onto land by a towing vehicle.

8 Claims, 10 Drawing Figures

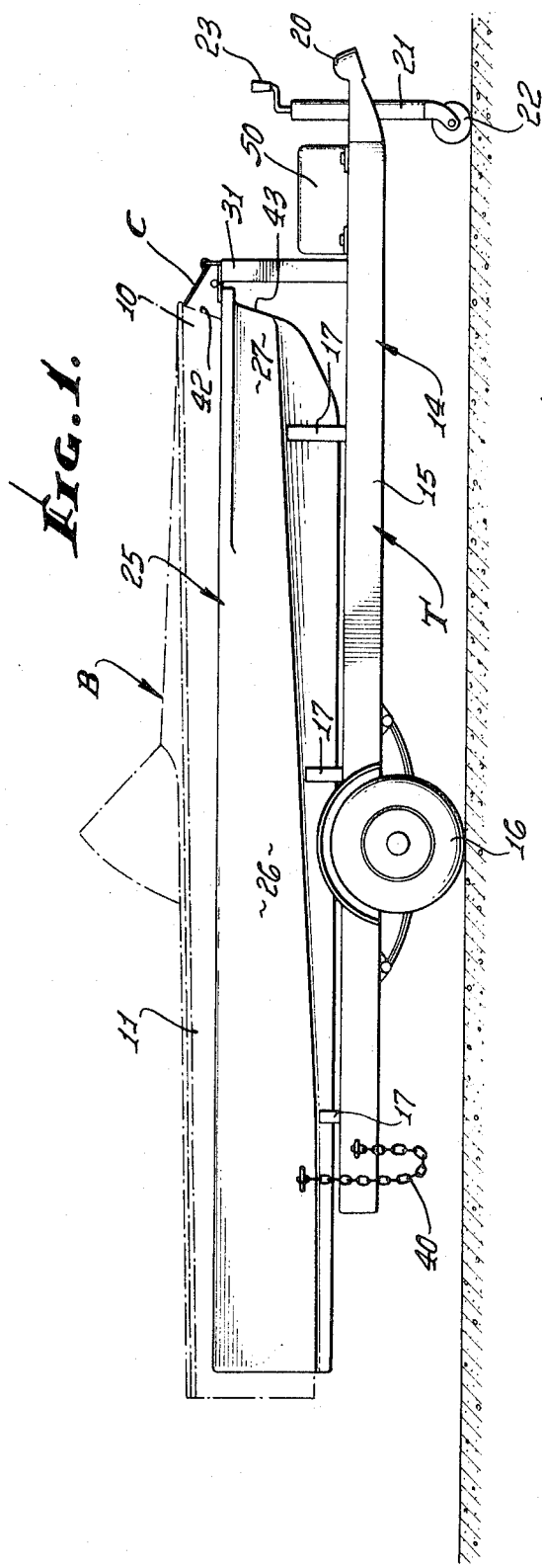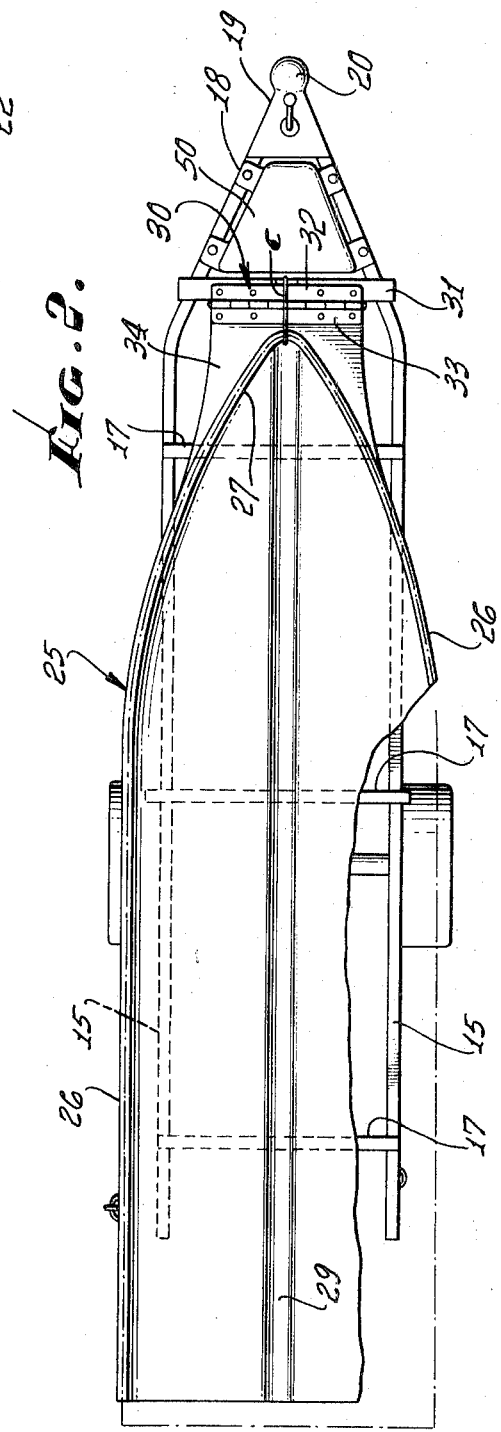

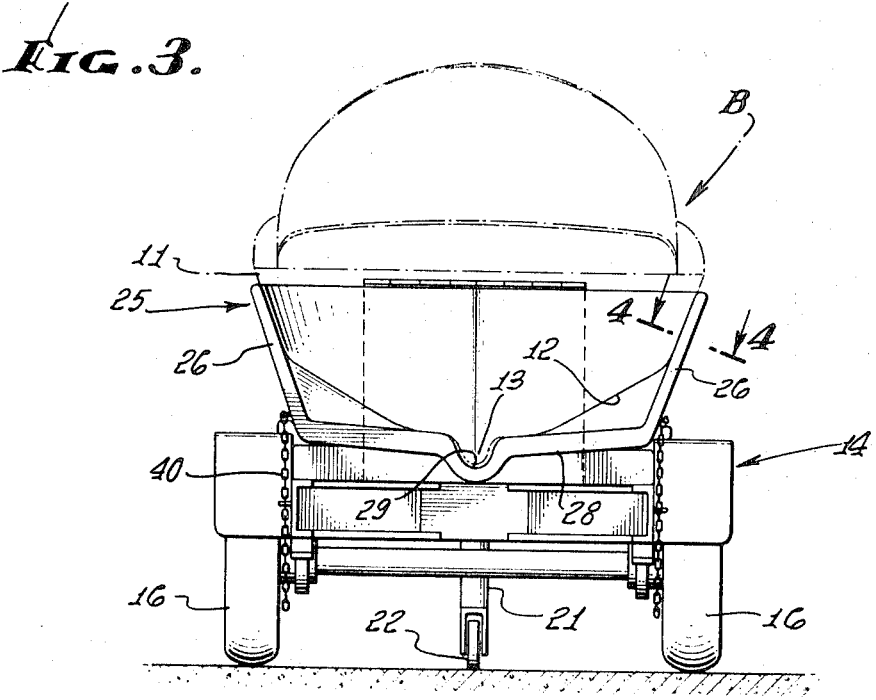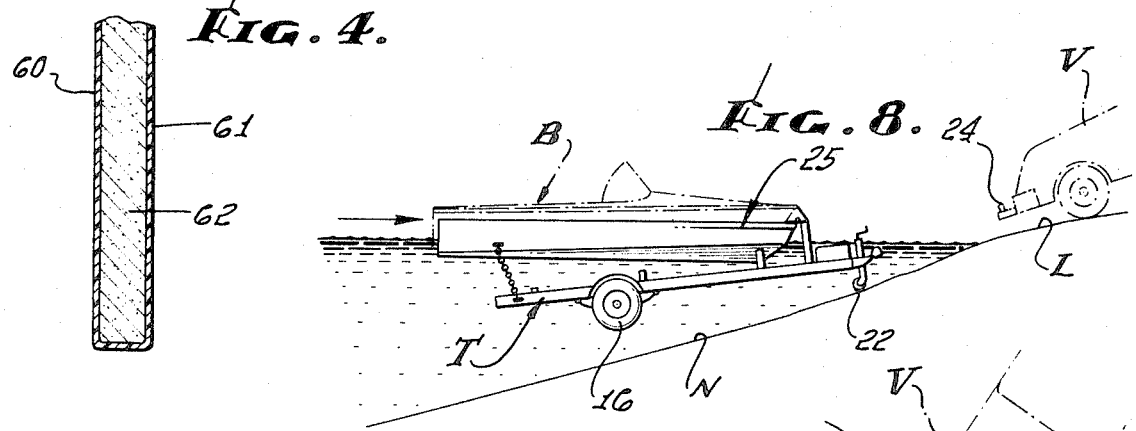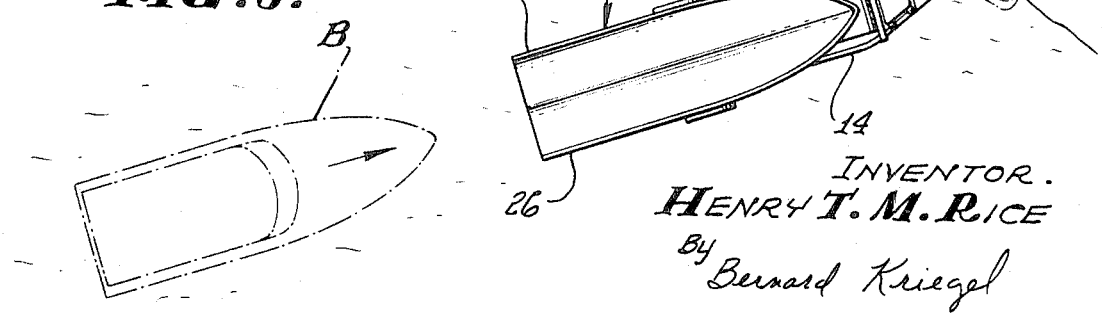

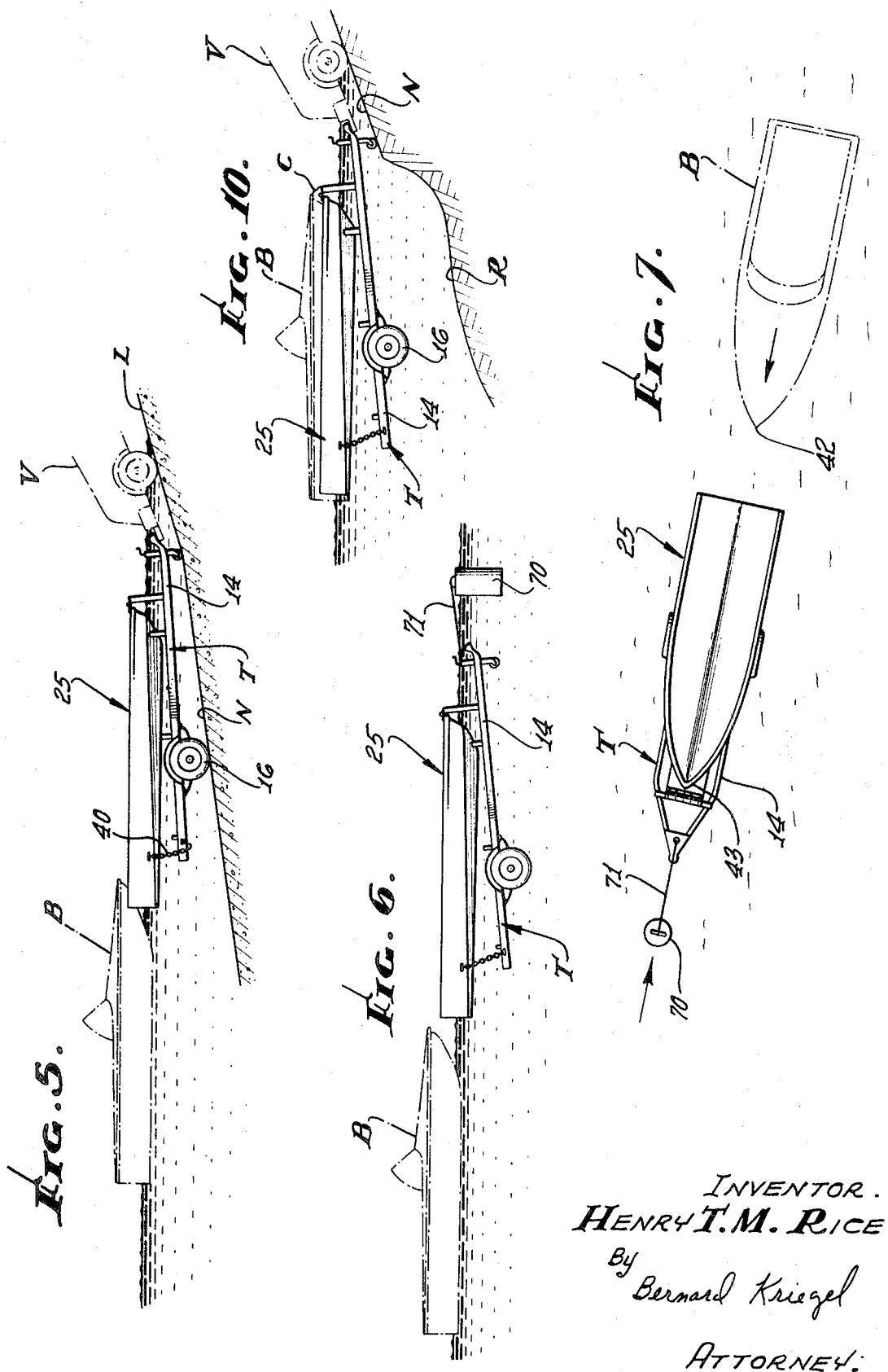

BOAT TRAILER

The present invention relates to trailers, and more particularly to trailers adapted to convey boats to and from launching sites.

Heretofore, it has been difficult to load and unload boats from and onto trailers at a launching site. Substantial manual force was required in moving the boat from the trailer into the water and in replacing the boat on the trailer. This difficulty is enhanced where the floor of the body of water drops away precipitously at the water edge, since there has been no way of supporting the rear portion of the trailer as it is backed by the towing vehicle into the water. After the boat has been removed from the trailer, the trailer, as a rule, has remained with the towing vehicle, and it is necessary for the operator of the boat to return it to the site from which it has been launched. The replacing of the boat over the trailer has also involved difficulties due to wind action, which tended generally to swing the boat out of an aligned position with the trailer.

By virtue of the present invention, a boat trailer is provided which includes a member capable of floating in water and with at least a substantial portion thereof projecting above the surface of the water, and with respect to which the trailer frame will drop away when the trailer with its float member is in the water. The floating member is capable of acting as a guide and receptacle to assist in aligning the boat with the trailer when the boat is to be moved back into the float member and onto the trailer, being restrained by the float member for moving laterally of the trailer. The boat and floatable trailer combination can, if desired, be moved as a unit under the power of the boat itself to an offshore location, whereupon the trailer can be anchored at such location in a manner that causes it to always head downwind, permitting the boat to be moved in the water directly upwind and in proper alignment with the trailer directly into the float member and trailer to its final position therewithin and thereon. The same action will occur when the trailer is secured at the launching or retrieval site, provided the rear wheels of the trailer are out of contact with the subaqueous bottom. The trailer and its float member can swing freely about its front portion for automatic disposition in a downwind direction, whereupon the boat can be driven directly upwind and into the float member supported on the trailer, without the boat encountering side drift problems.

By virtue of the present invention, trailers have been provided in which the float member supports the trailer frame in the water, enabling the trailer, with the boat disposed in the float member and secured therein, to act as a power source for moving both the trailer and the boat through the water to any desired destination. Moreover, the boat can be used for driving the trailer onto the shore to a sufficient extent, enabling a person to step onto dry land, as for the purpose of attaching the trailer to a towing vehicle, such as an automobile. The reverse is also true, since the automobile can back the trailer and boat carried thereby partially into the water, to the extent at which the boat propeller or propellers are in the water. Upon detaching the trailer hitch from the automobile, the power mechanism of the boat can be placed in reverse and one or more propellers will then pull the boat and the trailer attached thereto fully into the water, where the trailer will be supported in the water by the float member.

With the present invention, the boat is readily secured to the trailer, with the boat being prevented from moving laterally relative to the trailer by the float member, which confines it, the boat also being prevented from moving vertically relative to the trailer, as, for example, in traversing rough or bumpy roads while the trailer and boat combination are being towed by an automobile. Such relative vertical motion could induce boat damage, trailer damage, or both.

A further objective of the invention is to provide a trailer for boats in which the trailer has a floating shell therein to receive the boat when the latter is carried on the trailer, the float member or shell allowing the trailer frame to drop downwardly when the trailer and boat combination are backed into the water, with the shell being pulled downwardly of the trailer frame sufficiently to substantially free it from the boat, allowing unrestricted backing of the boat completely out of the floating shell. The shell carrying the trailer frame depending therefrom still projects above the surface of the water, remaining in a position to again receive the boat, which is movable into the shell under its own power, being guided to its final position by the sides of the shell, much in the nature of a ferry slip bringing a ferry boat to a predetermined final position of rest.

A further object of the invention is to provide a trailer for boats in which the trailer frame is suspendable in the water from an upper float which is carries, and in which the front portion of the trailer frame is also buoyant to prevent the boat receiving float shell from tilting upwardly in the water in a rearward direction. In fact, it is preferred for the shell to tilt downwardly in a rearward direction to facilitate movement of the boat from and into the floating shell.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense.

Referring to the drawings:

FIG. 1 is a side elevational view of a boat trailer embodying the invention, with a boat mounted thereon;

FIG. 2 is a top plan view of the boat trailer illustrated in FIG. 1;

FIG. 3 is a rear end view of the trailer, on an enlarged scale, as seen from the left ends of FIGS. 1 and 2, and with a boat disposed thereon;

FIG. 4 is an enlarged fragmentary section taken along the line 4—4 on FIG. 3;

FIG. 5 is a side view of a towing vehicle, trailer and boat disposed in a relative position for launching the boat from the trailer, or for the boat to be driven back over the trailer;

FIG. 6 is a side elevational view illustrating the trailer in the water moored to a buoy, and with the boat in position for movement back over the trailer, or in its position after having been removed from the trailer;

FIG. 7 is a top plan view of the FIG. 6 arrangement illustrating the mode of driving the boat back into the floating shell of the trailer, which is anchored in the water;

FIG. 8 is a side view illustrating the manner of using the boat power for moving the boat and trailer combination back toward the beach for reconnection of the trailer to the towing vehicle;

FIG. 9 is a top plan view illustrating the mode of moving the boat back over the trailer hitched to a towing vehicle, the trailer wheels being off the subaqueous bottom, enabling the trailer to swing in the wind;

FIG. 10 is a side elevational view illustrating the boat in the trailer shell and connected to the trailer, the trailer being secured to the towing vehicle, the rear wheels of the trailer being out of contact with the subaqueous bottom.

The boat trailer T illustrated in the drawings has been specifically designed for use in connection with a single hull boat B of any suitable construction. This boat has the usual tapered forward portion 10, sides 11, bottom 12 and central keel 13. The boat may be powered by one or more outboard motors (not shown) mounted on the stern of the boat, or by an inboard engine (not shown).

The boat trailer T includes a frame 14 comprising a chassis having spaced side members 15 supporting a set of rear road engaging wheels 16, the side members being interconnected by cross members 17. The forward portion 18 of the trailer or chassis tapers and is secured to a trailer hitch 19, including the usual socket member 20. This forward portion has a vertical frame member or jack 21 carrying a ground engaging wheel 22. By turning a suitable crank 23, the forward portion of the chassis can be raised or lowered to facilitate disconnection and reconnection of the hitch socket 20 from and onto the usual ball portion 24 (FIG. 8) of the trailer hitch fastened to the frame of the towing vehicle. Details of the jack are not shown, since it is a well-known device.

The longitudinally spaced cross members 17 are actually constituted as saddles for receiving a floatable member 25 in the form of a buoyant shell of generally boat-like shape, and having downwardly tapering sides 26, the forward portions 27 of which converge toward each other in a forward direction, these sides merging into a bottom 28 that has an elongate central recess 29 to receive the keel 13 of the boat. The rear of the shell 25 is open. The floatable shell extends from the forward portion of the trailer frame 14 and projects beyond the rear ends of the frame sides 15. At its forward end, it is movably connected, as by means of a transverse hinge 30, to a forward cross member 31 of the chassis frame that projects upwardly from its side members 15, the hinge being thereby located above the chassis frame 14. The hinge may be elongate, with one of the hinge plates 32 suitably fastened to the upright member 31, the other hinge plate 33 being suitably connected to a web 34 secured to and projecting from the upper forward portion of the shell 25. The shell itself, when the boat trailer is out of the water, rests upon the spaced saddles or cross members 17 of the trailer frame, as disclosed in FIG. 1.

The shell 25 conforms generally in shape to the boat B, which is adapted to be received therewithin, with the bottom of the boat resting on the bottom 28 of the shell, the keel 13 of the boat resting in the central trough or groove 29 of the floatable shell, and the sides 11 of the boat located closely adjacent to or touching the inner sides of the shell, the sides of the forward portion 10 of the boat converging toward each other and also conforming to the forward sides 27 of the shell. The rear of the boat B, when the latter is mounted fully within the shell 25, preferably extends rearwardly beyond the shell, or at least its propellers will extend beyond the rear of the shell. The forward end of the boat can be suitably secured to the chassis upright 31, as by means of a suitable cable C, which is disconnected whenever the boat is to be backed out of the shell 25 and off the trailer.

When the trailer T is in the water, the trailer frame 14 and its wheels 16 will drop downwardly of the flotation shell 25 to the extent limited by suitable stop members 40, such as chains, the upper ends of which are secured to the outer sides 26 of the shell at its rear and the lower ends of which are suitably attached to the side members 15 of the trailer frame. The weight of the trailer frame is such that it will pull the flotation shell 25 downwardly in the water to some extent, but such shell will still have its upper side portions 26 extending substantially above the surface of the water. Preferably, the shell 25 with the trailer frame 14 supported thereby will assume an attitude inclined upwardly in a forward direction, the flotation shell and trailer frame supported thereunder pulling the bottom 28 of the shell downwardly to a greater depth than occupied by the bottom of the boat when it floats in the water. The disposition of the trailer, with the boat mounted in its shell, in the water will cause the frame and shell combination 14, 25 to drop downwardly in the water with the bottom of the shell below the bottom of the floating boat, thereby permitting the boat to move astern under its own power completely out of the shell with substantially no restraint from the shell. Similarly, the boat B, with the shell 25 and frame 14 floating in the water, can also be moved in a fore direction into the shell, the bottom 12 of the boat being free from contact with the bottom 28 of the shell, the boat being guided by the sides 26 of the shell into its final position therewithin, in which the prow 42 of the boat engages the forward end 43 of the shell, whereupon the boat can be suitably secured by a cable, or the like, to the chassis upright 31.

The cable or other attaching means will preclude relative vertical movement of the forward portion of the boat with respect to the shell when the boat is being conveyed over land on the trailer T, the shell, of course, resting firmly within its saddles 17. Moreover, relative lateral movement of the boat B within the shell 25 cannot occur in view of the close conformance of the side portions 26, 27 of the flotation shell with the sides 11 and forward portions 10 of the boat.

If the weight of the trailer frame 14, and of the wheels 16, springs, jack 21, etc., were to tend to pull the forward portion of the shell 25 in a downward direction, when the trailer frame is suspended from the shell floating in the water, thereby tilting the shell in a downward and forward direction (that is, the rearward portion of the shell might be elevated with respect to the forward portion), this tendency can be offset by an additional flotation member 50 secured to the forward portion of the frame in any suitable manner. Accordingly, when the trailer T is launched in the water and with the wheels 16 off bottom, the forward float 50 tends to support and retain the forward part of the trailer frame 14 in an upward position, the rear part of the trailer frame extending below the shell to the extent limited by the stop members 40. Accordingly, the trailer frame 14 would be inclined in a rearward and downward direction, such as illustrated in FIGS. 6 and 8, supported from the shell 25 floating in the water.

The flotation member 25, as specifically disclosed (FIG. 4), may consist of inner and outer resin impregnated fiberglass walls 60, 61 enclosing a rigid polyurethane foam 62 which fills the entire interior of the shell space between the walls. The density of the rigid polyurethane foam is so selected that the flotation member 25 floats in the water supporting the trailer frame 14 suspended therebelow, the trailer frame and flotation member having such combined weight that the flotation member will float to a small vertical extent lower in the water than the boat B normally carried in and on the shell.

Various conditions under which the boat and trailer combination can be used are illustrated in FIGS. 5 to 10, inclusive. FIG. 5 illustrates the towing vehicle V on the beach L, having shifted the trailer downwardly along a sloping subaqueous bottom N, and in which the rear wheels 16 and chassis 14 have dropped away from the flotation shell 25, which will always remain floating in the water. As illustrated in FIG. 5, the towing vehicle V has backed the trailer T along the downwardly sloping body until the trailer frame 14 is located downwardly with respect to the flotation member 25, the flotation member having been pulled downwardly by the weight of the trailer sufficiently to be substantially free of the boat. The cable connecting the boat to the trailer frame is disconnected and the boat, using its own power, is backed out of the shell 25 without restraint, as illustrated in FIG. 5.

FIG. 5 also illustrates the remounting of the boat on the trailer. The boat need merely be steered toward the open rear portion of the flotation shell 25, moving into the shell until the prow 43 of prow 43 boat engages one or the other sides 26 of the shell, which will fully align the boat within the shell and asure its full positioning therewithin, whereupon a cable can be used to reattach the front of the boat to the trailer frame member 31. The vehicle V can then be used to pull the trailer T and boat B out of the water, the trailer frame moving upwardly until the sides 26 and bottom 28 of the shell reengage the sides 11 and bottom 12 of the boat. Continued pulling of the trailer out of the water will cause the trailer frame 14 to rise toward the shell until the frame saddles 17 reengage the shell, at which time the boat is fully supported by the trailer. The towing vehicle V can then convey the boat to any desired point.

If desired, the boat B and trailer T could be backed by the towing vehicle into the water and the trailer hitch disconnected, as by turning the crank 23 to jack the socket portion 20 of the hitch off the ball portion 24 affixed to the vehicle. The boat will remain connected to the trailer through the forward cable C, and the boat power can then be used to move the boat and trailer combination into the water. When backed sufficiently, the boat is appropriately operated to move it and the trailer assembly to a desired mooring point in the water, as, for example, to a buoy 70 suitably anchored in the water (FIG. 6). While being moved through the water, the trailer frame 14, of course, will occupy its downward position relative to the flotation shell 25. The forward portion of the trailer frame is secured to the buoy by a cable 71 and the cable C securing the boat to the trailer disconnected, allowing the boat to back out of the shell (FIG. 6), which, as described above, occupies a lower position in the water than the boat so that the bottoms of the boat and of the shell are out of engagement.

When the boat is to be reconnected to the trailer secured to the buoy, it is driven to the location of the trailer T. The trailer is free to swing relative to the buoy, the wind moving the trailer in the water in a direction in which it is downwind of the buoy, much in the nature of an airport wind sock. Accordingly as illustrated in FIG. 7, the boat B can be placed in general alignment with the trailer and its shell 25 and powered upwind into the shell, being guided into its appropriate position by the boat engaging the sides 26 of the shell. When the prow 42 of the boat engages the forward end 43 of the shell, the latter will be fully nested within the shell and the boat can be reconnected by the cable C to the trailer. The trailer then being released from the buoy and the boat trailer combination moved to any desired location, as toward the shore, under the power of the boat.

If the subaqueous bottom N adjacent to the beach L is gradually sloping, as illustrated in FIG. 8, the boat and trailer combination can be powered by the boat to bring the forward portion of the boat and trailer to a substantial distance out of the water. The front wheel 22 will ride up the sloping bottom N, as will the rear wheels 16, the trailer frame 14 swinging about the axis of the hinge upwardly toward the float shell 25 and boat B. So long as a portion of the boat propeller is in the water, the boat power is available for moving the trailer up the sloping bottom N and can place the forward portion of the trailer on dry land L. A person can then step from the boat directly onto dry land, whereupon he can move the vehicle V from its parking site and back it into a position adjacent to the front end of the trailer, the trailer hitch then being reconnected.

The boat and trailer can be launched in the reverse of the manner just described, since it is unnecessary for the towing vehicle to back the boat and trailer completely into the water. With the front portion of the trailer and the boat on the beach, but with the boat propeller in the water, the trailer can be disconnected from the vehicle, and a person can then step from dry land onto the trailer and into the boat. The power of the boat is sufficient to back the boat B and trailer T into the water as a unit, if desired, since the wheels 16, 22 will roll down the sloping bottom N.

If the trailer frame 14 and the flotation shell 25 have been backed downwardly sufficiently in the water, the trailer T can remain connected to the vehicle V and the boat B backed out of the floating shell 25 into the water under its own power.

As illustrated in FIGS. 9 and 10, the boat B can be readily driven into the flotation shell 25 of the trailer without being adversely affected by cross winds. The trailer is disclosed as coupled to the towing vehicle V, but the water depth adjacent to the beach is too great for the rear trailer wheels 16 to engage the bottom R. As a result, the trailer frame 14 has dropped downwardly relative to the flotation member 25, which is then floating in the water with its bottom 28 at a lower depth than the bottom 12 of the boat. The trailer hitch serves as a pivot point, allowing the wind to swing the trailer T in a downwind direction, thereby enabling the boat to be placed in alignment with the flotation shell 25 (FIG. 9) and driven directly upwind into the shell, being guided by the sides 26 of the latter to its appropriate final position forwardly within the shell. The boat can then be secured by the cable C to the trailer frame, whereupon the towing vehicle V is operated to pull the trailer and boat combination onto dry land L, the front wheel 22 first supporting the trailer and the rear wheels 16 then engaging the sloping bottom N and moving the trailer frame 14 upwardly until its saddles 17 engage the shell 25 and move the shell upwardly into engagement with the bottom 12 of the boat for the purpose of supporting the latter on the trailer.

It is, accordingly, apparent that the trailer T, when free to swing in the wind, will enable the boat operator to avoid the side drift problems that would be encountered if the trailer were in such position that cross winds would be acting on the boat upon its being placed in alignment with the trailer. Even if some cross wind were encountered, the entry of the prow 42 of the boat into the shell 25 and its engagement with one of the sides 26, coupled with the continued forward motion of the boat into the shell, would swing the f'oat and frame around into a position in which the boat could continue entering the shell to its final position therewithin. Conversely, the shell 25 could swing the boat B into an appropriate position of full alignment in the shell, much in the nature of a ferry boat entering a ferry slip.

I claim:

1. In a trailer apparatus for carrying a boat: a trailer frame having ground engaging wheels and adapted to support the boat; means buoyant in water above the trailer frame and having sufficient buoyancy in the water to support the trailer frame in the water in a pendant condition below the buoyant means with the buoyant means projecting above the surface of the water when said wheels are disengaged from the ground, said buoyant means comprising a receptacle extending substantially from the forward portion to the rearward portion of said frame for receiving and supporting shell, boat therewithin; means interconnecting said trailer frame and buoyant means to allow relative vertical movement between said frame and to means final position said frame the wheels to move downwardly of said buoyant means and away from the boat carried by the apparatus much the boat trailer apparatus is in the water to permit substantially free horizontal movement of the boat from and onto the apparatus; said interconnecting means including means connecting the forward portion of said buoyant means to the forward portion of said trailer frame and permitting relative vertical movement between said trailer frame and buoyant means; and stop means on said trailer frame engageable with stop means on said buoyant means rearwardly of said connecting means limiting the extent of downward movement of said trailer frame away from said buoyant means.

2. In apparatus as defined in claim 1; said means connecting the forward portion of said buoyant means to the forward portion of said trailer frame comprising a hinge.

3. In apparatus as defined in claim 1; said receptacle including side portions engaging the sides of said boat to retain said boat against substantial lateral movement relative to said trailer frame.

4. In apparatus as defined in claim 1; said receptacle having side portions conforming to the sides of the boat and engaged by the boat when the boat moves into said receptacle and over the trailer frame to guide the boat to a central position along said receptacle and trailer frame.

5. In apparatus as defined in claim 1; said receptacle having side portions conforming to the sides of the boat and engaged by the boat when the boat moves into said receptacle and over the trailer frame to guide the boat to a central position along said receptacle and trailer frame; said side portions engaging said boat when mounted in the receptacle to retain said boat against substantial lateral movement relative to said receptacle and trailer frame.

6. In apparatus as defined in claim 1; said receptacle having side portions conforming to the sides of the boat and engaged by the boat when the boat moves into said receptacle and over the trailer frame to guide the boat to a central position along said receptacle and trailer frame; said side portions engaging the boat when mounted in the receptacle to retain said boat against substantial lateral movement relative to said receptacle and trai'er frame; and retainer means engaging the boat when disposed in final position in said receptacle to prevent relative vertical movement between the boat and said frame.

7. In apparatus as defined in claim 1; and means buoyant in water secured to a forward portion of said trailer frame.

8. In a trailer apparatus for carrying a boat: a trailer frame having ground engaging wheels; an elongate sheel buoyant in water above said frame and substantially conforming to the length and shape of the boat, said shell including an elongate bottom on which the boat can rest, said bottom engaging and being supported by the trailer frame, said shell being adapted to receive and support the boat, said buoyant shell having sufficient buoyancy in the water to support the trailer frame in the water in a pendant condition below the shell with the shell projecting above the surface of the water; and means interconnecting said trailer frame and shell to allow relative vertical movement between said frame and shell to permit said frame to move downwardly of said shell to withdraw the lower portion of said shell from supporting engagement with the boat; said interconnecting means including means connecting the forward portion of said buoyant shell to the forward portion of said trailer frame; and stop means on said trailer frame and engageable with stop means on said shell rearwardly of said connecting meams limiting the extent of downward movement of said trailer frame away from said shell.

* * * * *

UNITED STATES PATENT OFFICE
CERTIFICATE OF CORRECTION

Patent No. 3,755,834  Dated September 4, 1973

Inventor(s) Henry T. M. Rice

It is certified that error appears in the above-identified patent and that said Letters Patent are hereby corrected as shown below:

Column 2, line 30: change "is" to --it--.

Column 4, line 66: after "extending" insert --downwardly--.

Column 5, line 36: cancel "prow 43" and substitute --the--.

Column 7, line 20: change "f'oat" to --float--;

line 38: cancel "shell," and substitute --the--;

lines 41,42: cancel "to means final position said frame the wheels" and substitute --buoyant means to permit said frame and wheels--;

line 44: cancel "much" and substitute --when--.

Column 8, line 28: change "trai'er" to --trailer--.

line 37: change "sheel" to --shell--.

Signed and sealed this 5th day of March 1974.

(SEAL)
Attest:

EDWARD M. FLETCHER, JR.  
Attesting Officer

C. MARSHALL DANN  
Commissioner of Patents